P. TAYLOR.
TOOL.
APPLICATION FILED JUNE 10, 1920.

1,424,861.

Patented Aug. 8, 1922.
2 SHEETS—SHEET 1.

Witness:
Geo. C. Davison

Inventor:
Peter Taylor
By Wilkinson, Huxley, Byron + Knight
Attys

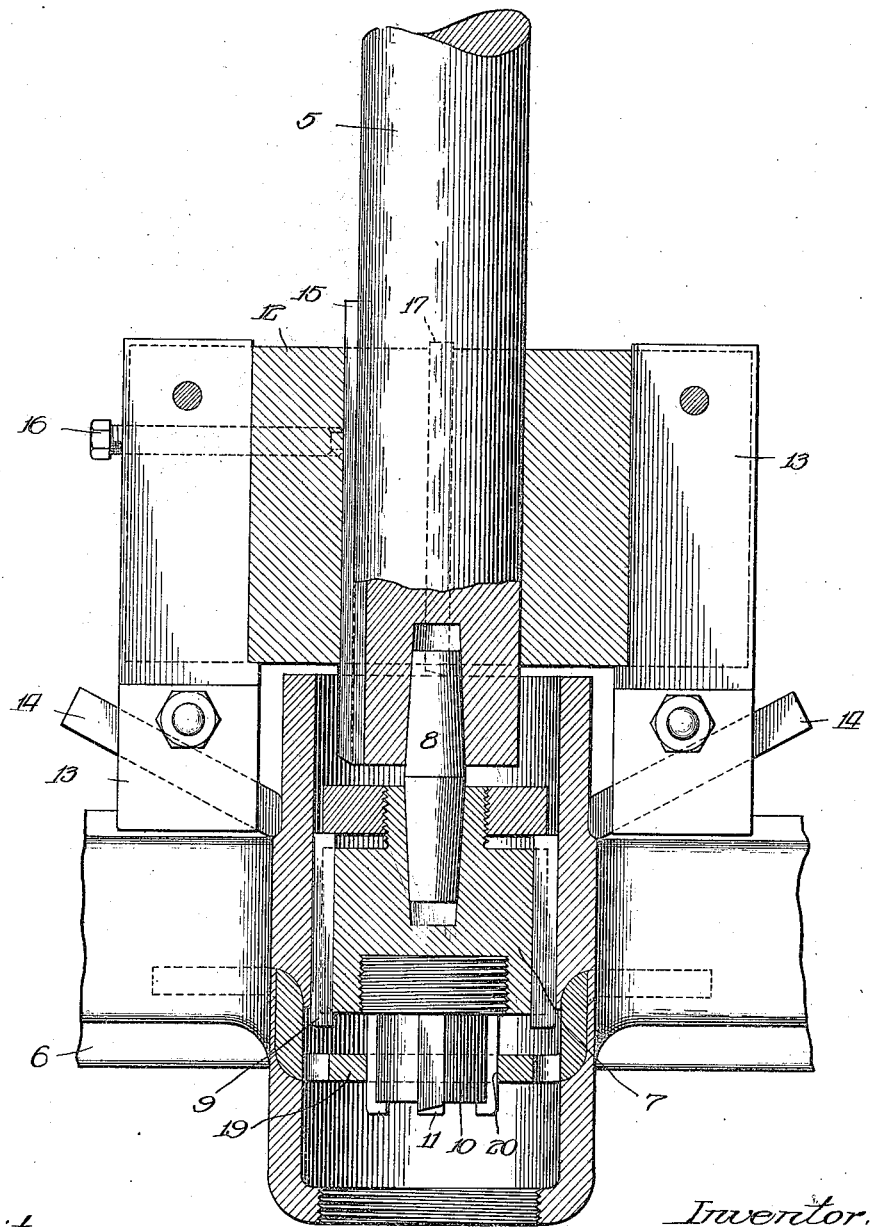

UNITED STATES PATENT OFFICE.

PETER TAYLOR, OF OTTUMWA, IOWA.

TOOL.

1,424,861.

Specification of Letters Patent.  Patented Aug. 8, 1922.

Application filed June 10, 1920. Serial No. 387,814.

*To all whom it may concern:*

Be it known that I, PETER TAYLOR, a citizen of the United States, residing at Ottumwa, in the county of Wapello and State of Iowa, have invented certain new and useful Improvements in Tools, of which the following is a specification.

My invention relates to machine tools, and particularly to a tool whereby a plurality of cylindrical surfaces may be machined or finished at a single operation.

My invention relates to a novel tool for finishing metal hubs and the like.

I carry out my invention by mounting on a spindle a plurality of heads, one of which may be provided with cutting tools for engaging an outer surface of a cylindrical object, such as a hub, and a second head carrying cutting elements for engaging interior surfaces of the same article.

An object of my invention is to provide an improved machine tool whereby a plurality of cuts may be made on a cylindrical object at a single operation.

Another object is to provide a machine tool which will be efficient in operation and will reduce the cost of machining hubs and the like.

The above and other objects will be apparent from the specification and drawings, and will be particularly pointed out in the appended claims.

In the drawings,—

Figure 3 is a vertical sectional view of my invention as used in connection with a hub such as that of a mine car wheel.

Figure 1:
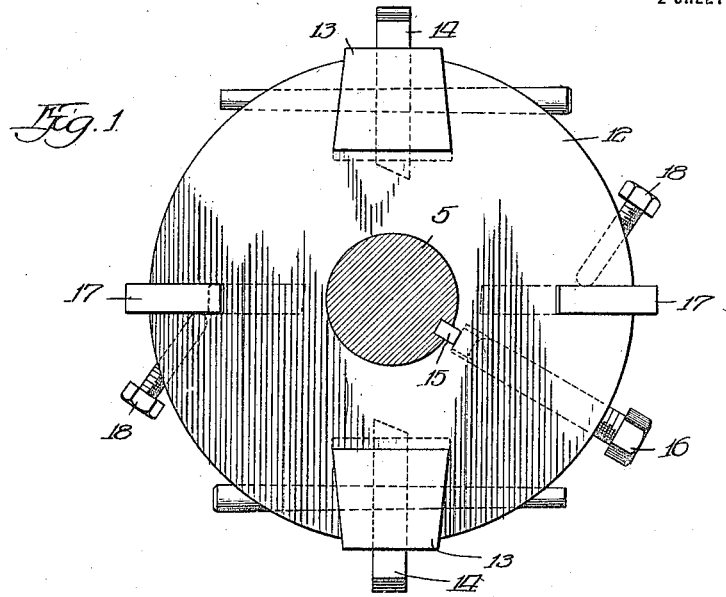
Figure 1 is an end view of the preferred embodiment of my invention.
Figure 2:
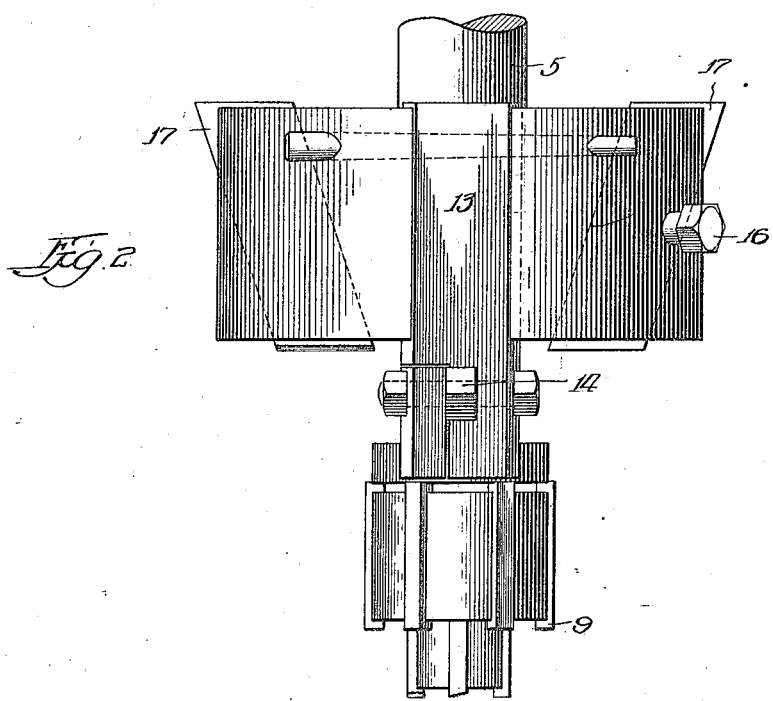
Figure 2 is a plan view of Figure 1.

I have shown my invention in connection with the machining of a cast metal wheel such as a mine car wheel similar to that shown in my co-pending application Serial No. 374,052, and have arranged the cutting elements so that four cutting operations may be performed at one time.

In the drawings, 5 represents a machine spindle, which in some types of machines is caused to rotate while the article being machined, which, in this instance, is a cast metal wheel 6, is held on a table. In other types of machines the spindle would be fixed, while the wheel 6 rotated. At the end of the spindle 5 the head 7 is mounted, the mounting in the illustration shown being that of a double dowel pin 8, so that the head may be readily applied to and removed from the spindle 5. The head 7 is provided with a plurality of cutters 9 which may be removably supported in the head, in accordance with standard practice. In the illustration shown the head 7 has an extension head 10 which is smaller in diameter than the head 7, and this head 10 in like manner is provided with cutting elements 11. Mounted exteriorly of the hub of the wheel 6 and in keyed relation to the shaft 5 is a third head 12. This head is provided with tool holders 13 for removably supporting cutting tools 14. In the arrangement shown the head 12 is adapted to be longitudinally adjustable along the spindle 5. The means whereby I prefer to secure the adjustable mounting of the head 12 includes a key 15 which is in splined relation with the head 12, so that the head 12 may be moved therealong, at the same time having rotative connection with the spindle 5. For securing the head 12 in lengthwise adjusted postion along the spindle, a set screw 16 or other means may be employed which bears against the key 15. The head 12 is provided with other cutting elements 17 removably retained in position by set screws 18 or other clamping means. The cutting elements 17 in the form shown herein are adapted to dress the rear end of the hub of the wheel 6.

With reference to Figure 3, it will be noted that a partition 19 extends across the interior of the hub, which partition has a centrally disposed opening 20. It is to machine this or a similar opening that the smaller head 10 is adapted to cooperate with the larger head 7 carried at the end of the spindle 5. It will be noted that the advance of the spindle 5 with respect to the hub being machined is such that the interior of the hub may be properly machined. In the illustration the advance of the head 7 may be greater than the advance of the head 12 to machine a portion of the exterior of the hub. In like manner the cutting elements 17 should not advance the same amount as the head 7 is advanced.

To effect the proper cutting relation between the cutting elements 14 and 17 and the cutting elements on the heads 7 and 10, the head 12 is secured along the spindle 5 in such manner as to cause its cutting elements to engage the surfaces where each is machined at such time in the relative advance of the spindle and wheel as to cause these cutting elements to end their path of travel at the same time that the other cutting elements end. This arrangement is made possible by splining the head 12 on the spindle 5 and arranging the projection of the cutters 17 with respect to this head.

It will be noted that by my invention it is possible to machine the hub of a cast metal wheel, finishing the bore of the wheel (which bore may consist of portions of different diameters), a portion of the exterior of the hub, and the rear end of the hub, in a single operation. Such a tool, therefore, reduces considerably the cost of finishing cast metal hubs and makes possible the turning out of a considerable number of hubs of the same size and dimensions and which will all be machined exactly alike. This feature is especially important in quantity production.

I have shown my invention as applied to a cast metal wheel, but I do not wish to be limited thereto, as my invention is susceptible of application to various kinds of machine work, especially with reference to machining cylindrical objects of varying interior and exterior diameters. The head 12 may be provided with more than two tool holders 13 if other cylindrical surfaces than the one engaged by the tools 14 are to be machined.

It is believed that the operation of my invention is clear. However, a brief description of the operation may not be amiss.

When the work is set up, the heads 7, 10 and 12 are so positioned on the spindle 5 as to cause the cutting elements carried by these heads to function at the proper times in the relative lengthwise movement of the spindle with respect to the work, all of which relative adjustment may be easily attained by the usual methods. The work being set up, one of the parts is caused to rotate and with such rotation the parts are brought together with a degree of rapidity consistent with the work in question, and the work may be stopped when the surfaces to be machined have been properly engaged by the various cutting elements of the tool embodying my invention.

While I have described more or less precisely the details of my invention, I do not wish to be understood as limiting myself thereto, as I contemplate changes in form, the proportion of parts and substitution of equivalents as circumstances may suggest or render expedient, without departing from the spirit of my invention.

I claim:

1. A tool for machining hubs and the like, including, in combination, a spindle, a head keyed to said spindle, means for holding said head in adjusted position on said spindle, cutters carried by said head adapted to engage a portion of the outer surface of a hub, a second head mounted upon said spindle in axial alignment therewith, said second head being provided with cutters for machining an interior surface of a hub, and a third head secured to said second head, said third head being provided with cutters for machining another portion of the interior of said hub.

2. A machine tool for machining hubs and the like, including, in combination, a spindle, a cutter head having arms adapted to overlie the outer surface of a hub, a second head mounted upon said spindle in axial alignment therewith, and a third head mounted upon said second head, each of said heads being provided with cutting elements for engaging portions of said hub, and means permitting adjustment of said cutter head relative to the other heads and for holding said cutter head in adjusted position.

Signed at Ottumwa, Iowa, this 7 day of June, 1920.

PETER TAYLOR.